United States Patent
Heo

(10) Patent No.: US 9,431,843 B2
(45) Date of Patent: Aug. 30, 2016

(54) MULTIMEDIA TERMINAL DEVICE FOR HIGH-SPEED CHARGING AND METHOD OF CONTROLLING THE SAME

(71) Applicant: Hyundai Motor Company, Seoul (KR)

(72) Inventor: Kwang Seung Heo, Seoul (KR)

(73) Assignee: Hyundai Motor Company, Seoul (KR)

( * ) Notice: Subject to any disclaimer, the term of this patent is extended or adjusted under 35 U.S.C. 154(b) by 139 days.

(21) Appl. No.: 14/286,019

(22) Filed: May 23, 2014

(65) Prior Publication Data

US 2015/0162780 A1    Jun. 11, 2015

(30) Foreign Application Priority Data

Dec. 6, 2013    (KR) .................. 10-2013-0151179

(51) Int. Cl.
*H02J 7/00*    (2006.01)

(52) U.S. Cl.
CPC ...... *H02J 7/0055* (2013.01); *H02J 2007/0062* (2013.01)

(58) Field of Classification Search
CPC ..... Y02E 60/12; H02J 7/0054; H02J 7/1423; H02J 7/0013; H02J 7/0073; H02J 7/0091; H01M 10/44; H01M 10/46
USPC ................................. 320/103, 125
See application file for complete search history.

(56) References Cited

U.S. PATENT DOCUMENTS

| | | | |
|---|---|---|---|
| 2008/0246438 A1* | 10/2008 | Lu | H02J 7/027 320/137 |
| 2012/0153747 A1* | 6/2012 | Lu | H02J 7/0031 307/131 |
| 2012/0299529 A1* | 11/2012 | Guo | H02J 7/35 320/101 |
| 2013/0076301 A1* | 3/2013 | Bastami | H02J 7/0008 320/107 |
| 2013/0231848 A1* | 9/2013 | Roberts | F02N 11/0807 701/112 |

FOREIGN PATENT DOCUMENTS

| | | |
|---|---|---|
| JP | 2007-313988 A | 12/2007 |
| JP | 2008-222122 A | 9/2008 |
| JP | 2011-244679 A | 12/2011 |
| KR | 10-2005-0123470 | 12/2005 |
| KR | 10-2006-0042586 | 5/2006 |
| KR | 10-2013-0081570 A | 7/2013 |

\* cited by examiner

*Primary Examiner* — Richard Isla Rodas
*Assistant Examiner* — Mohammed J Sharief
(74) *Attorney, Agent, or Firm* — Mintz Levin Cohn Ferris Glovsky and Popeo, P.C.; Peter F. Corless

(57) ABSTRACT

A multimedia terminal device for high-speed charging that allows for high-speed charging of a portable electronic device connected to a multimedia terminal and a method of controlling the same are provided. The multimedia terminal device includes a power converter that is configured to convert a voltage from a battery to a voltage for the high-speed charging and to supply the converted voltage to the multimedia terminal. In addition, a switching circuit is configured to select a high-speed charging mode when an engine is driven and a low-speed charging when the engine is stopped.

7 Claims, 3 Drawing Sheets

MULTIMEDIA TERMINAL DEVICE FOR HIGH-SPEED CHARGING AND METHOD OF CONTROLLING THE SAME

CROSS-REFERENCE TO RELATED APPLICATION

This application claims under 35 U.S.C. §119(a) the benefit of Korean Patent Application No. 10-2013-0151179 filed Dec. 6, 2013, the entire contents of which are incorporated herein by reference.

BACKGROUND (a) Technical Field

The present invention relates to a multimedia terminal device for high-speed charging and a method of controlling the same, and more particularly to a multimedia terminal device for high-speed charging that performs high-speed charging of a portable electronic device connected to a multimedia terminal and a method of controlling the same.

(b) Background Art

In general, an indoor center facia panel of a vehicle includes an Audio Video Navigation (AVN) system and a multimedia terminal that connects an external smart device to the AVN system or charges the smart device. The multimedia terminal includes an auxiliary (AUX) jack and a universal serial bus (USB) jack to which an external smart device (e.g., a smartphone, a tablet personal computer (PC), etc.) is connected. When the smart device is connected to the multimedia terminal, the smart device is connected to the AVN system to transmit data and to charge the smart device.

Referring to FIG. 1, an existing multimedia terminal 10 includes a USB voltage of 5V and 500 mA from a head unit 10 that operates as an upper level controller of the AVN system. When the external smart device such as a smartphone, a table PC, and the like is connected to the USB terminal of the multimedia terminal 10 via a cable, the smart device is charged at low-rate by the USB voltage of 5V and 500 mA. However, since the charging speed to the smart device is substantially low with only the USB voltage supplied from the head unit to the multimedia terminal and charging time requires a significant amount of time and decreasing the user convenience and satisfaction.

SUMMARY

The present invention provides a multimedia terminal device, for high-speed charging of an external smart device that may include a power converter configured to convert a voltage from a battery to a voltage for the high-speed charging and to supply the converted voltage to the multimedia terminal and a switching circuit configured to select a high-speed charging mode when an engine is driven and a low-speed charging when the engine is stopped, and a method of controlling the same.

In accordance with an aspect of the present invention, a multimedia terminal for high-speed charging may include: a power converter configured to convert a voltage from a battery into a high-speed charging voltage; a connecting terminal to which an external smart device may be connected to be charged; a head unit (e.g., a second controller) configured to supply a low-speed charging voltage; and a charging controller configured to determine a low-speed charging mode and a high-speed charging mode of the external smart device based on whether an engine is driven to supply the low-speed charging voltage or the high-speed charging voltage to the connecting terminal.

The multimedia terminal may further include a switching circuit configured to supply the high-speed charging voltage converted by the power converter to the connecting terminal when the engine is driven and supply the low-speed charging voltage from the head unit to the connecting terminal when the engine is stopped. The multimedia terminal may further include a switching circuit unit configured to supply the high-speed charging voltage converted by the power converter to the charging controller when the engine is driven and supply the low-speed charging voltage from the head unit to the charging controller when the engine is stopped.

In accordance with another aspect of the present invention, a method of controlling a high-speed charging multimedia terminal device may include: converting a voltage of a battery into a high-speed charging voltage by a power converter; selecting a charging mode of determining a high-speed charging mode and a low-speed charging mode based on whether an engine is driven or stopped; carrying out by a charging controller a high-speed charging mode by supplying the high-speed charging voltage converted by the power converter to a connecting terminal; and carrying out by the charging controller the low-speed charging mode by supplying the low-speed charging voltage from a head unit to the connecting terminal when the engine is stopped.

In the selecting of a charging mode, the charging controller may be configured to receive a signal determining whether the engine is driven or stopped, determine the high-speed charging mode when the engine is driven, and determine the low-speed charging mode when the engine is stopped. In addition, the selecting of a charging mode may include: receiving by a switching circuit unit separately connected to the charging controller a signal to determine whether the engine is driven or stopped; firstly switching by the switching circuit unit such that the high-speed charging voltage converted by the power converter is supplied to the charging controller when the engine is driven; and secondly switching by the switching circuit unit such that the low-speed charging voltage is supplied from a head unit to the charging controller.

Accordingly, the power converter that converts a voltage of a battery into a voltage for the high-speed charging and the switching circuit that selects a high-speed charging mode when an engine is driven and a low-speed charging when the engine is stopped may be provided in the multimedia terminal, to charge an external smart device such as a smartphone, a tablet PC, and the like at high speed (e.g., at a higher speed than the related art) during the driving and to improve user convenience. In addition, since the high-speed charging to the external smart device may be performed by the switching circuit when the engine is driven and the low-speed charging may be performed when the engine is stopped, the battery of a vehicle may be prevented from being discharged and damage of the vehicle may be also prevented from unintended charging.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
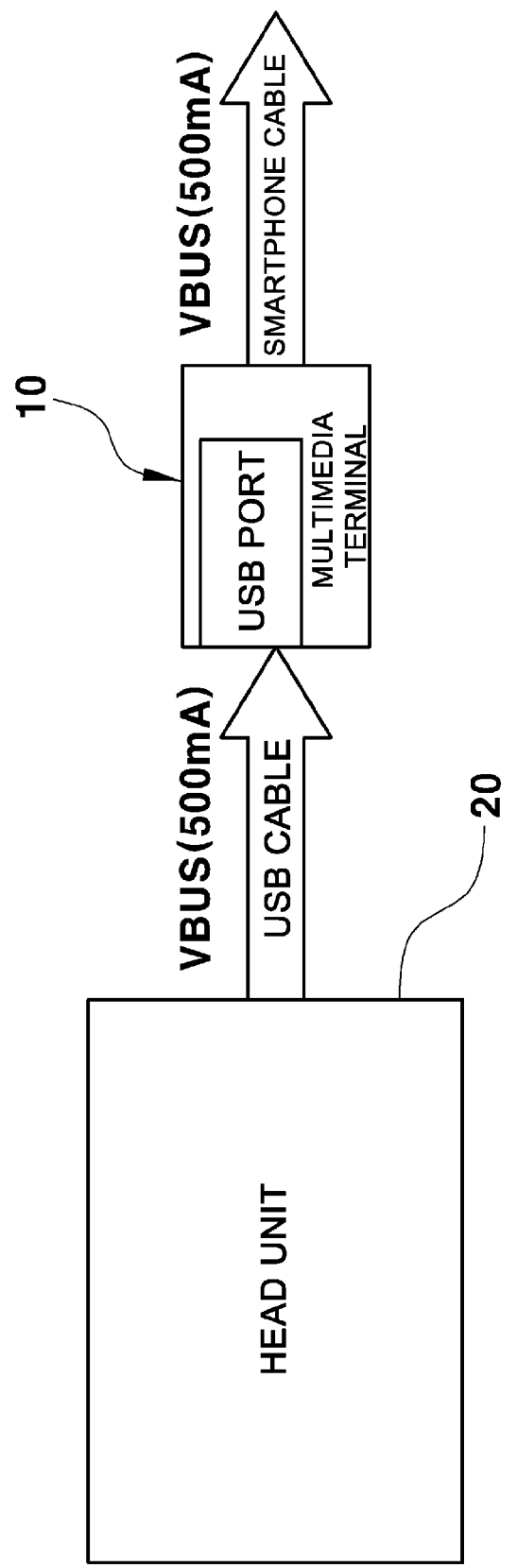
FIG. 1 is an exemplary schematic view illustrating charging using an existing multimedia terminal according to the related art.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the accompanying drawings. The present invention allows high-speed charging of a smart device, such as a smartphone, a table PC, and the like, connected to a multimedia terminal which may be disposed in or around (e.g., in the vicinity of) a center facia panel when an engine is driven and low-speed charging thereof when the engine is stopped. Here, the multimedia terminal device for high-speed charging according to an exemplary embodiment of the present invention and operations thereof will be described in detail as follows.

Figure 2:
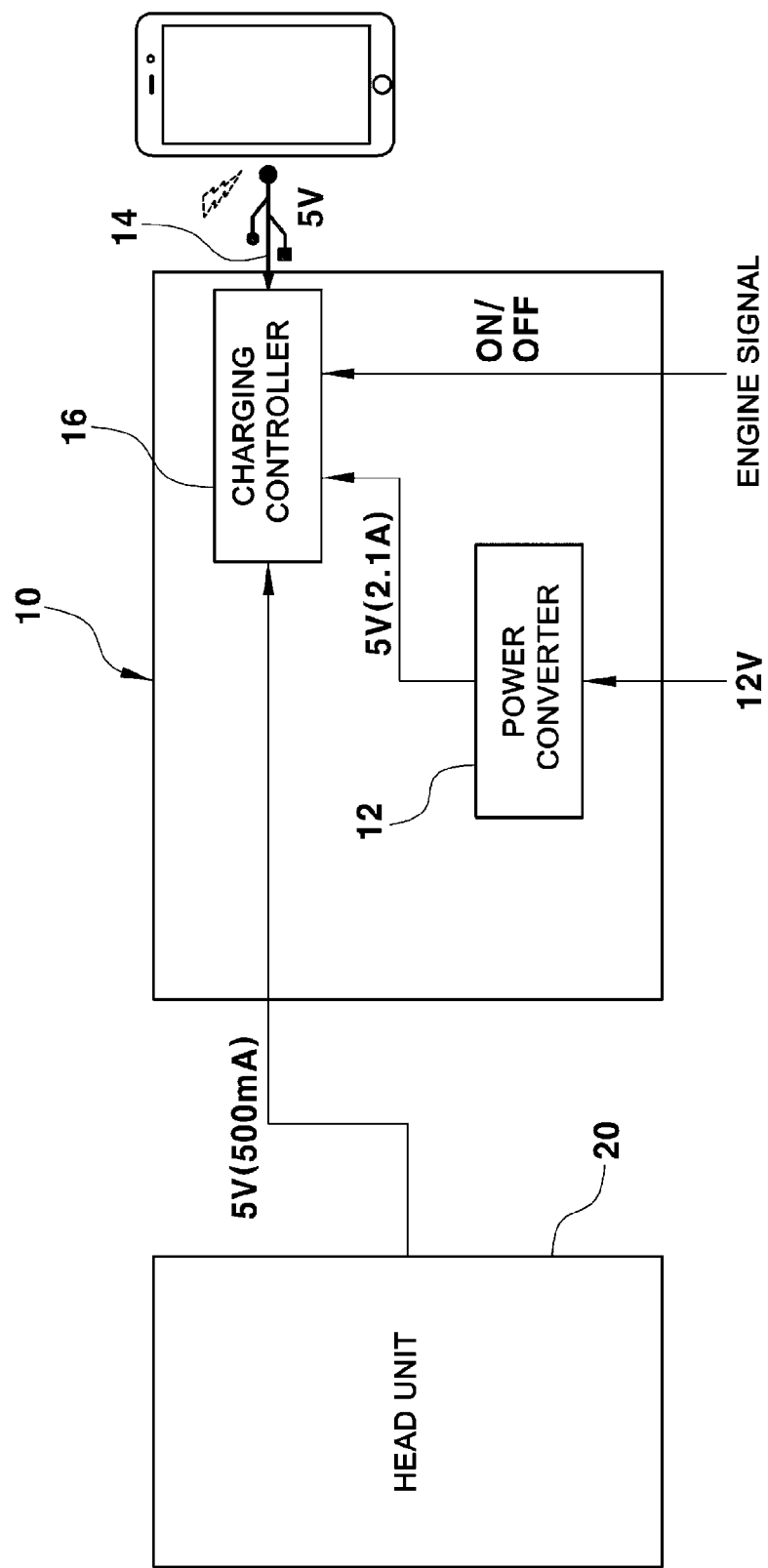
FIG. 2 is an exemplary block diagram illustrating a multimedia terminal device for high-speed charging according to an exemplary embodiment of the present invention.

FIG. 2 is an exemplary block diagram illustrating the multimedia terminal device for high-speed charging according to an exemplary embodiment of the present invention. As illustrated in FIG. 2, a power converter 12 and a charging controller 16 may be installed within the multimedia terminal 10. The power converter 12 may be configured to convert a voltage of about 12V of a battery into a voltage of about 5V (about 2.1 A) for the high-speed charging, may be connected to the battery, and may be disposed within the multimedia terminal 10. The charging controller 16 may include a switching circuit configured to select a high-speed charging mode and a low-speed charging mode, may be connected to the power converter 12 within the multimedia terminal 10 and a head unit 20 (e.g., a second controller).

In particular, an input end of the charging controller 16 may be connected to an output end of the power converter 12 and an output end of the head unit 20 to receive power therefrom while an output end of the charging controller 16 may be connected to a connecting terminal 14 to which an external smart device such as USB power may be connected. In this situation, a voltage of about 5V (about 500 mA) for the low-speed charging may be input from the head unit 20 to the charging controller 16.

An engine-driven signal of a vehicle and an engine-stopped signal as reference signals to select a high-speed charging voltage or a low-speed charging voltage may be input to the charging controller 16 from the head unit 20. Thus, when the charging controller 16 receives a signal to determine whether the engine is driven or not, the charging controller 16 may be configured to determine the high-speed charging mode when the engine is driven or the low-speed charging mode when the engine is stopped. In other words, when the charging controller 16 receives the engine-driven signal, the switching circuit installed within the charging controller 16 may be configured to select (e.g., switch to) the converted high-speed charging voltage and supply the selected voltage to the connecting terminal 14 to charge the external smart device at high speed (e.g., at an increased speed). Thus, the external smart device such as a smartphone, a table PC, and the like may be charged at a higher speed and user convenience may be enhanced.

Furthermore, when the charging controller 16 receives the engine-stop signal, the switching circuit of the charging controller 16 may be configured to select the low-speed charging voltage and supply the selected voltage to the connecting terminal 14 to charge the external smart device at a substantially low speed (e.g., at a speed lower than the high speed charging). Accordingly, when the low-speed charging is performed when the engine is stopped, the battery of the vehicle may be prevented from being discharged.

Figure 3:
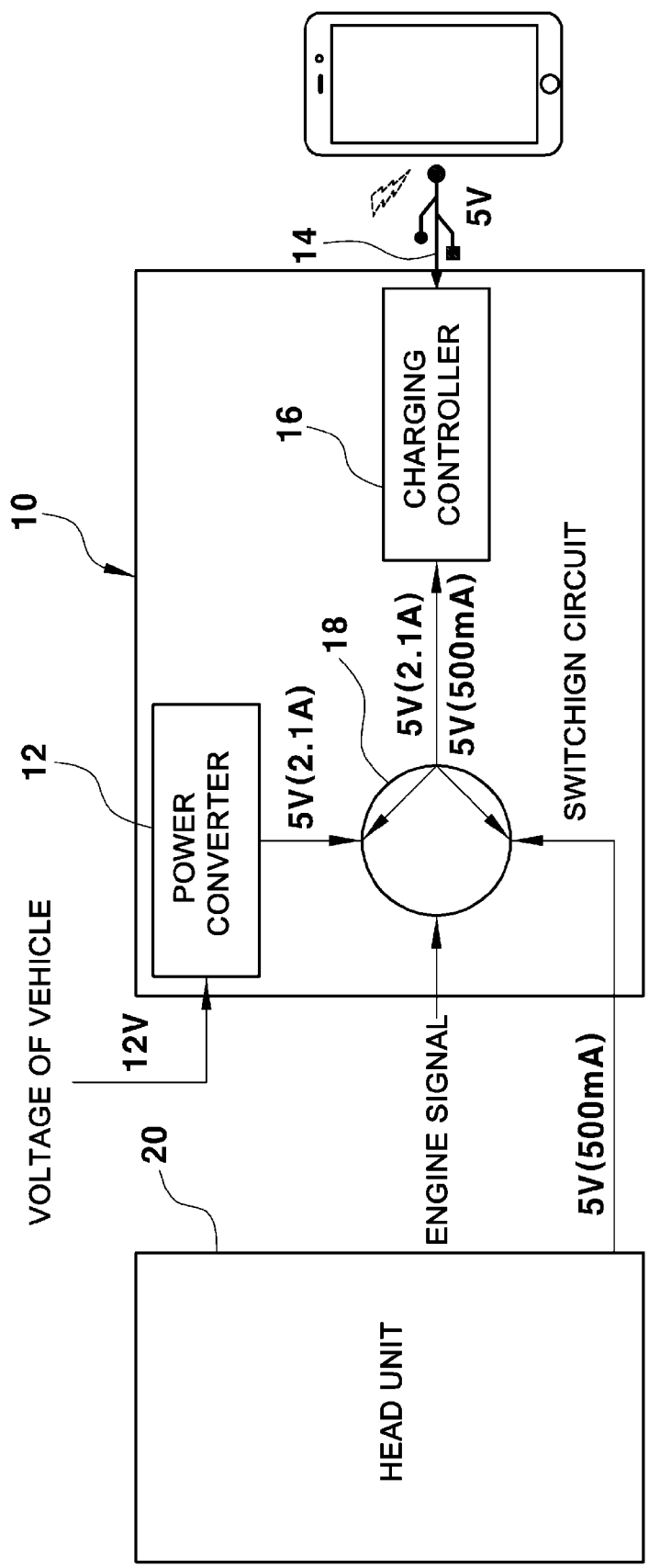
FIG. 3 is an exemplary block diagram illustrating a multimedia terminal device for high-speed charging according to another exemplary embodiment of the present invention.

Hereinafter, details and operations of the multimedia terminal device for high-speed charging according to another exemplary embodiment of the present invention will be described as follows. FIG. 3 is an exemplary block diagram illustrating a multimedia terminal device for high-speed charging according to another exemplary embodiment of the present invention. As illustrated in FIG. 3, a power converter 12 and a charging controller 16 may be installed within a multimedia terminal 10 and a switching circuit unit 18 that may be configured to select a high-speed charging voltage and a low-speed charging voltage may be separately installed therein.

In this exemplary embodiment, the power converter 12 installed within the multimedia terminal 10 may be configured to convert a voltage of about 12V of a battery into a voltage of about 5V (about 2.1 A) for the high-speed charging and may be connected to the battery. The charging controller 16 may be configured to supply the high-speed charging voltage or the low-speed charging voltage and may be connected to the switching circuit unit 18 within the multimedia terminal 10.

The switching circuit unit 18 may be switched to supply the high-speed charging voltage converted by the power converter 12 to the charging controller 16 when the engine is driven and to supply the low-speed charging voltage from the head unit 20 to the charging controller 16 when the engine is stopped. Further, an input end of the switching circuit unit 18 may be connected to an output end of the power converter 12 and an output end of the head unit 20 to receive power therefrom while an output end of the switching circuit unit 18 is connected to the charging controller 16.

In particular, an engine-driven signal of a vehicle and an engine-stopped signal as reference signals to select a high-speed charging voltage or a low-speed charging voltage may be input to the switching circuit unit 18. When the switching circuit unit 18 receives the engine-driven signal or the engine-stopped signal, the switching circuit unit 18 may be switched, by the controller, to the high-speed charging mode when the engine is driven or to the low-speed charging mode when the engine is stopped. In other words, when the switching circuit unit 18 receives the engine-driven signal, a first switching may be performed to supply the high-speed charging voltage converted by the power converter 12 to the charging controller 16 for the high-speed charging mode. Then, the first switching operation may allow the high-speed charging of the external smart device by which the high-speed charging voltage of about 5V (about 2.1 A) converted by the power converter 12 is supplied to the charging controller 16 and the charging controller 16 may be configured to supply the high-speed charging voltage to the connecting terminal. Thus, the external smart device such as a smartphone, a tablet PC, and the like may be charged at a substantially high speed and user convenience may be enhanced.

Moreover, when the switching circuit unit 18 receives the engine-stopped signal, the second switching may be performed to supply the low-speed charging voltage from the head unit 20 to the charging controller 16 for the low-speed charging mode. Thus, the charging controller 16 may be configured to supply the low-speed charging voltage to the connecting terminal 14 after the low-speed charging voltage of about 5V (about 500 mA) converted by the head unit 20 due to the second switching to charge the external smart device at a substantially low speed and the battery of a vehicle may be prevented from being discharged.

The invention has been described in detail with reference to exemplary embodiments thereof. However, it will be appreciated by those skilled in the art that changes may be made in these exemplary embodiments without departing from the principles and spirit of the invention, the scope of which is defined in the accompanying claims and their equivalents.

What is claimed is:

1. A multimedia terminal for high-speed charging, comprising:
   a power converter configured to convert a voltage from a battery into a high-speed charging voltage;
   a connecting terminal to which an external smart device is connected to charge the external smart device;
   a first controller configured to supply a low-speed charging voltage; and
   a charging controller configured to determine a low-speed charging mode and a high-speed charging mode of the external smart device based on whether an engine is driven to supply the low-speed charging voltage or the high-speed charging voltage to the connecting terminal.

2. The multimedia terminal of claim 1, further comprising:
   a switching circuit unit configured to supply the high-speed charging voltage converted by the power converter to the connecting terminal when the engine is driven and supply the low-speed charging voltage from the first controller to the connecting terminal when the engine is stopped.

3. The multimedia terminal of claim 1, further comprising:
   a switching circuit unit configured to supply the high-speed charging voltage converted by the power converter to the charging controller when the engine is driven and supply the low-speed charging voltage from the first controller to the charging controller when the engine is stopped.

4. A method of controlling a high-speed charging multimedia terminal device, comprising:
   converting, by a power converter, a voltage of a battery into a high-speed charging voltage;
   selecting, by a switching circuit, a charging mode of determining a high-speed charging mode and a low-speed charging mode based on whether an engine is driven or stopped;
   performing, by a charging controller, a high-speed charging mode by supplying the high-speed charging voltage converted by the power converter to a connecting terminal; and
   performing, by the charging controller, the low-speed charging mode by supplying the low-speed charging voltage from a first controller to the connecting terminal when the engine is stopped.

5. The method of claim 4, wherein, in the selecting a charging mode, the charging controller is configured to:
   receive a signal to determine whether the engine is driven or stopped;
   determine the high-speed charging mode when the engine is driven; and
   determine the low-speed charging mode when the engine is stopped.

6. The method of claim 4, wherein the selecting a charging mode comprises:
   receiving, by a switching circuit unit separately connected to the charging controller, a signal to determine whether the engine is driven or stopped;
   firstly switching, by the switching circuit unit, to supply the high-speed charging voltage converted by the power converter to the charging controller when the engine is driven; and
   secondly switching, by the switching circuit unit, to supply the low-speed charging voltage is supplied from the first controller to the charging controller.

7. A multimedia terminal for high-speed charging, comprising:
   a power converter configured to convert a voltage from a battery into a high-speed charging voltage;
   a connecting terminal to which an external smart device is connected to charge the external smart device;
   a first controller configured to supply a low-speed charging voltage;
   a charging controller configured to determine a low-speed charging mode and a high-speed charging mode of the external smart device based on whether an engine is driven to supply the low-speed charging voltage or the high-speed charging voltage to the connecting terminal; and
   a switching circuit unit configured to supply the high-speed charging voltage converted by the power converter to the connecting terminal when the engine is driven and supply the low-speed charging voltage from the first controller to the connecting terminal when the engine is stopped,
   wherein an input end of the switching circuit unit is connected to an output end of the power converter and an output end of the first controller to receive power therefrom, and an output end of the switching circuit unit is connected to the charging controller.

* * * * *